United States Patent [19]

Liu

[11] Patent Number: 5,011,205
[45] Date of Patent: Apr. 30, 1991

[54] TELESCOPICALLY-OPERATED SAFETY VEHICLE BUMPER

[76] Inventor: Shiu-Yen Liu, P.O. Box 55-47, Taipei, Taiwan

[21] Appl. No.: 549,754

[22] Filed: Jul. 9, 1990

[51] Int. Cl.$^5$ .............................................. B60R 19/02
[52] U.S. Cl. .......................................... 293/5; 293/9; 293/134; 180/276
[58] Field of Search .......................... 293/5, 6, 9, 10; 180/276

[56] References Cited

U.S. PATENT DOCUMENTS

| | | | |
|---|---|---|---|
| 3,472,332 | 10/1969 | Halvajian | 180/276 |
| 3,677,595 | 7/1972 | Hamilton | 293/5 |
| 3,947,061 | 3/1976 | Ellis | 293/5 |
| 4,932,697 | 6/1990 | Hun | 293/5 |

*Primary Examiner*—Robert R. Song

[57] ABSTRACT

A safety vehicle bumper includes a bumper mounted on two guide rods secured to several driving pistons reciprocating in at least one set of twin cylinders, which bumper can be operatively extended outwardly to prevent a close hit on a car body by another object by deeply treading a brake pedal for pneumatically or hydraulically moving the piston and the secured guide rods and the bumper outwardly for safety purpose.

2 Claims, 3 Drawing Sheets

TELESCOPICALLY-OPERATED SAFETY VEHICLE BUMPER

BACKGROUND OF THE INVENTION

Edward M. Halvajian disclosed a combination impact cushioning bumper and automatic roadway brake in his U.S. Pat. No. 3,472,332 including an upper impact cushioning bumper mechanism 20 and a lower roadway brake mechanism 22. The bumper bar 34 and the brake shoe 52 are protruded frontwardly beyond a car body to possibly increase a wind resistance for a running car and to influence its esthetic appearance especially when a streamline car is a tendency of modern design. If Halvajian device is inferentially mounted on a rear portion of a car, a rear car when colliding the Halvajian's car positioned beyond such a rear car may impact his bumper 34 to swing down the brake shoe 52 to be braked on the roadway, deteriorating the collision result.

The present inventor has found the defects of Halvajian's device and invented the present safety vehicle bumper telescopically extended and retracted.

SUMMARY OF THE INVENTION

The object of the present invention is to provide a safety vehicle bumper including a bumper mounted on two guide rods secured to a driving piston means, which bumper can be operatively extended outwardly to prevent a close hit on a car body by another object by greatly treading a brake pedal for pneumatically or hydraulically moving the piston and the secured guide rods and the bumper outwardly for safety purpose.

DETAIL DESCRIPTION

Figure 1:
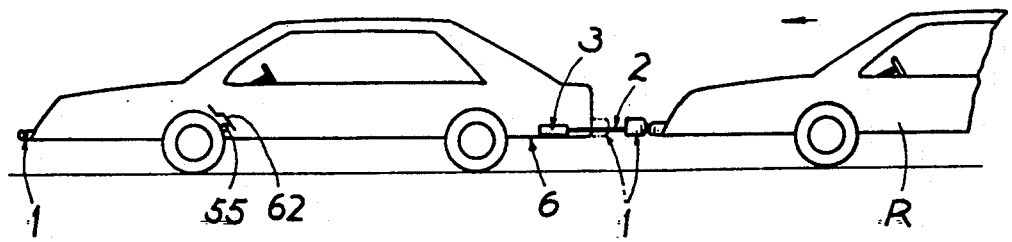
FIG. 1 is an illustration of the present invention.

As shown in FIGS. 1-6, the present invention comprises: a bumper 1, two guide rods 2, a driving means 3, a driving fluid booster 4, and a control means 5. Most elements of this invention may be mounted on a chassis 6 or car bottom (not shown).

The bumper 1 is secured to two guide rods 2 by universal joints 11. Each guide rod 2 is reciprocatively held in a cylindrical sleeve 61 formed on a chassis 6 of a car having an outer end portion 21 connected with the bumper 1 and having an inner end portion 22 secured to a piston rod 33 of the driving means 3, and an elbow portion 23 approximate to the inner end portion 22 for rotatably mounting an actuating roller 24 thereon.

Figure 4:
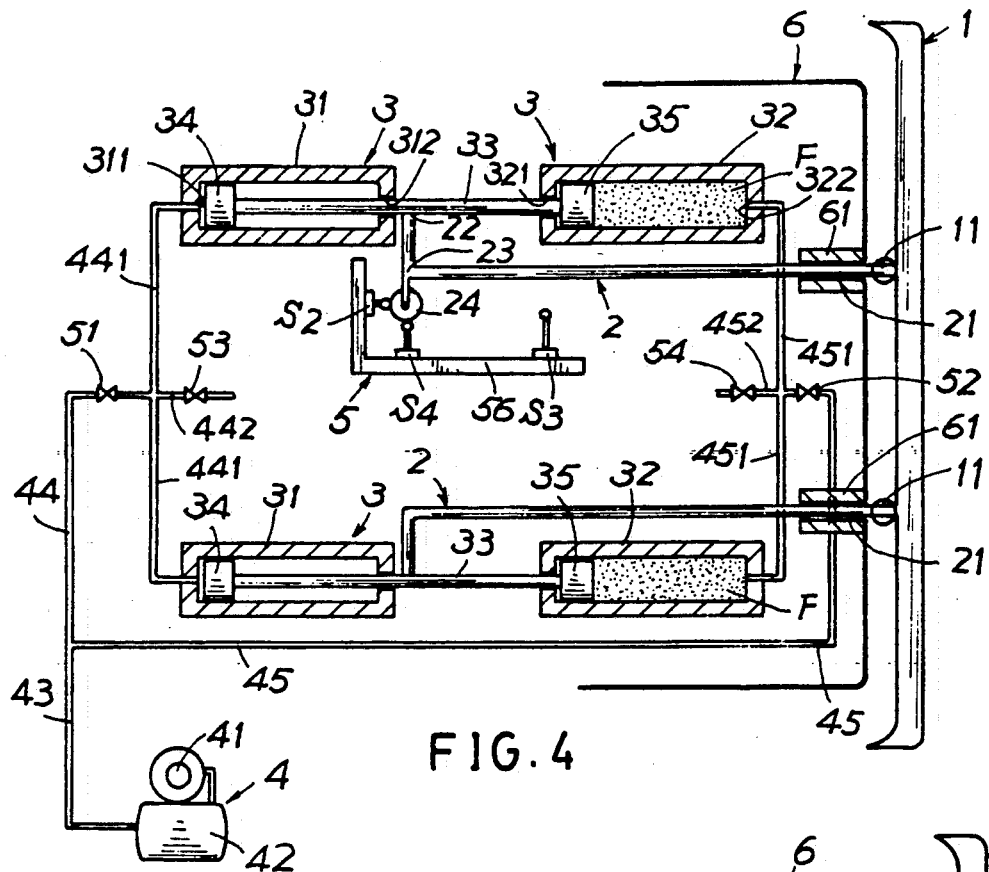
FIG. 4 is an illustration of the present invention when retracting the bumper.
Figure 5:
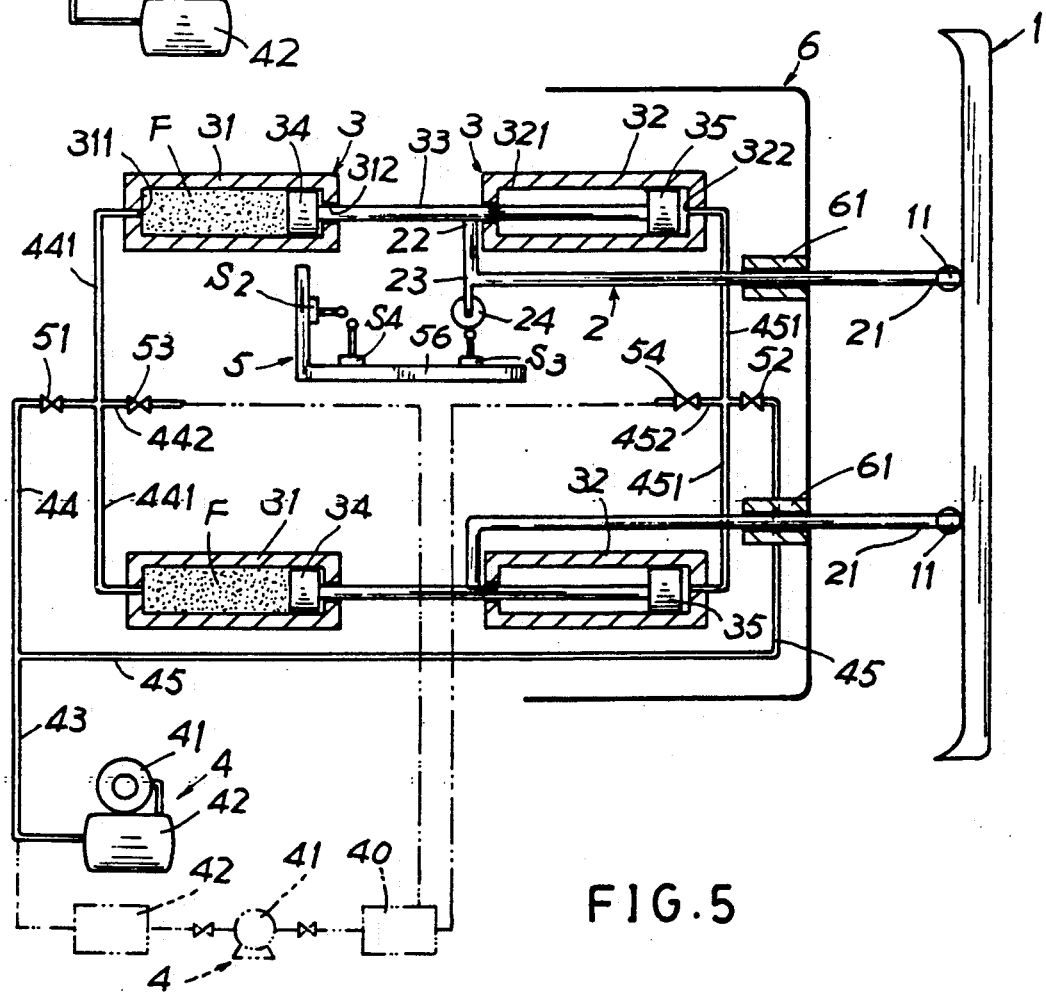
FIG. 5 shows an extended bumper in accordance with the present invention.

The driving means 3 includes at least one set of twin cylinders 31, 32 having two pistons 34, 35 secured on two opposite ends of a piston rod 33 reciprocating in the two cylinders 31, 32. As shown in FIGS. 4, 5, the twin cylinders 31, 32 are two set including a first (upper) set and a second (lower) set. The number of sets of twin cylinders 31, 32 of this invention is not limited.

The fluid booster 4 includes a booster 41, a fluid accumulator 42, and delivery pipes 43, 44, 45 in which the two pipes 44, 45 are branched from the main pipe 43. The booster 41 may be an air compressor for producing compressed air F of about 5-7 kg/cm² which can be adjusted to keep constant in the accumulator 42. If the fluid is a hydraulic oil, the booster 41 as shown in dotted line of FIG. 5 may be a hydraulic pump for pumping hydraulic oil from a storage tank 40 to an accumulator 42 for keeping a constant output pressure. For hydraulic system, the oil fluid from venting pipe 442 or 452 may be returned into tank 40. The piston rod 33 reciprocates through a right rod hole 312 of primary cylinder 31, and through a left rod hole 321 of secondary cylinder 32.

Figure 3:
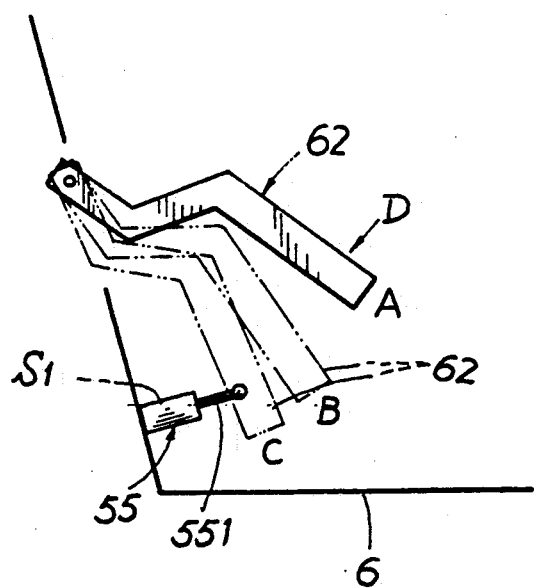
FIG. 3 shows a brake pedal and a s sensor of the present invention.
Figure 6:
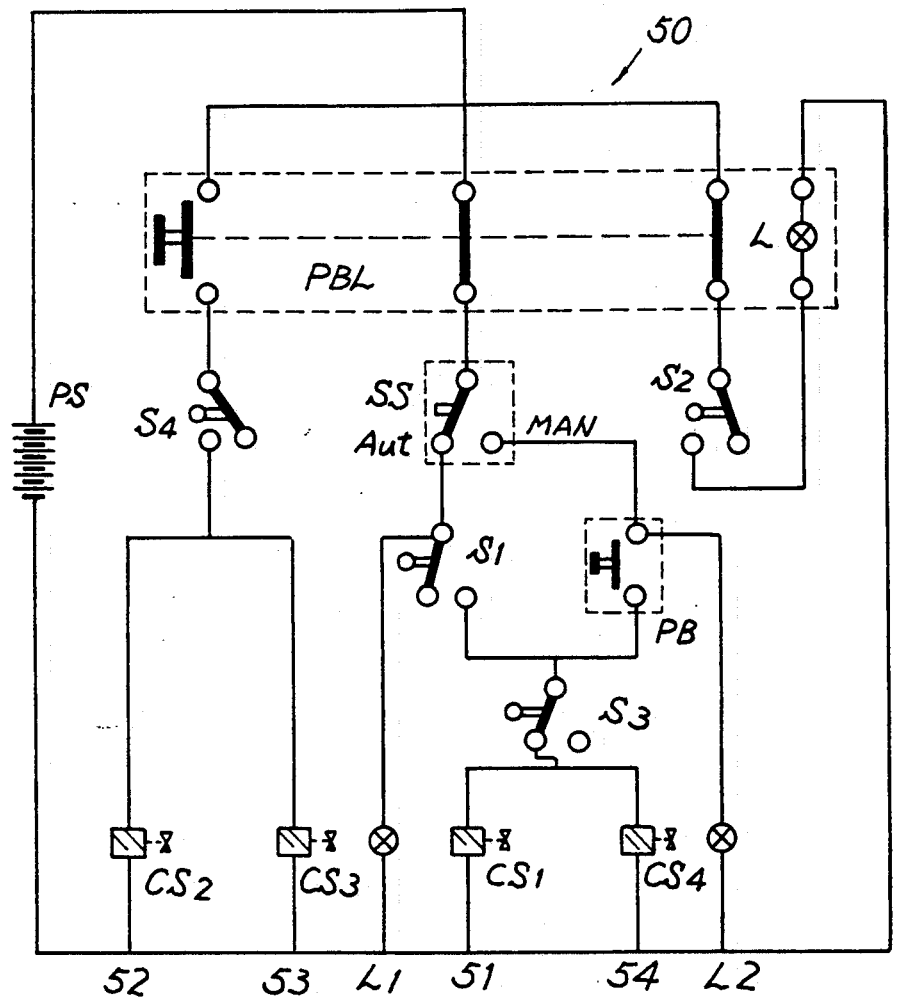
FIG. 6 is a control circuit of the present invention.

The control means 5 includes a sensor 55 near a driver's seat having an adjusting lever 551 adjustably formed therein to be depressed by the brake pedal 62 as shown in FIG. 3, an electrical control circuit 50 as shown in FIG. 6 and a plurality of solenoid valves 51, 52, 53 and 54 all being normal close (NC) and controlled by the circuit 50. The first solenoid valve 51 having electromagnetic coil CS1 fromed therein is formed in the fluid pipe 44 which is trifurcated into two branch pipes 441 respectively led into each primary cylinder 31 of the twin cylinders 31, 32 through a left hole 311 formed in a left end of cylinder 31; a vent pipe 442 open to the air if the fluid is a compressed air having a third solenoid valve 53 having coil (CS3) formed in the vent pipe 442. The second solenoid valve 52 having coil CS2 is formed in the fluid pipe 45 which is trifurcated into two branch pipes 451 respectively led into each secondary cylinders 32 through a right hole 332 fromed in a right end portion of the cylinder 32, and a vent pipe 452 open to the air if the fluid is an air having a fourth solenoid valve 54 (having coil CS4) formed in the pipe 452.

The control means 5 further includes a positioning adjuster 56 having a microswitch S3 formed on a right dead point of a moving stroke of the piston 34, 35, two microswitches S2, S4 formed on a left dead point of the piston stroke. All microswitches are actuated by an actuating roller 24. The position of the lever 551 for microswitch S1 in sensor 55 and the position of microswitch S3, S2, S4 on the adjuster 56 may be optionally adjusted according to the pedal stroke or piston movement stroke in the cylinders 31, 32.

The primary cylinder 31 has a capacity and piston stroke same as that of the secondary cylinder 32, but both cylinders 31, 32 providing opposite operation with each other. For instance, when the bumper 1 is to be extended from FIG. 4 to FIG. 5 the primary cylinder 31 is driven for directing compressed air therein and the secondary cylinder 32 is driven for releasing air therefrom.

As shown in FIG. 6, the control circuit 50 of the present invention includes a selector switch SS for automatic or manual telescopic operation, in which if the switch SS is selected to the manual operation MAN, the indicator lamp of manual operation L2 will be lit. After depressing a manual push-button switch PB, the coil CS1 of the solenoid valve 51 will be powered by power source PS to open the valve 51 to direct compressed air into primary cylinders 31 to drive pistons 34, 35, rods 33, 2 to extend the bumper 1 outwardly. The coil CS4 is also conducted to open solenoid valve 54 to release the air into vent pipe 452 as discharged from the secondary cylinders 32 as urged by pistons 35 driven by the inlet compressed air. The microswitch S2 is released from the actuating roller 24 to light up the indicator lamp L in the illuminated multiple-contact push button PBL to indicate that the bumper 1 has been extended outwardly.

When the bumper 1 is extended to a predetermined position to allow the roller 24 to actuate the microswitch S3 as shown in FIG. 5, the switch S3 is acutuated to stop power supply to solenoid valves 51, 54 to interrupt the inlet of compressed air into cylinders 31 and also close the venting pipe 452 since solenoid valve 54 is normally closed without power supply. The compressed air F remained in the cylinders 31 will serve as a sound cushioning device for absorbing any impact force acting on the bumper 1.

For retracting the bumper 1, the push button PBL is depressed to power the coil CS2, CS3 to open the solenoid valves 52, 53 respectively to direct compressed air into secondary cylinders 32 to retract the pistons 35, 34 rods 33, 2 and to retract the bumper 1. The compressed air in cylinders 31 is released through vent pipe 442 since the valve 53 is opened. When the bumper 1 is returned to its retracted position, the roller 24 formed on the elbow 23 of the rod 2 will depress the microswitches S4, S2 to disconnect power supply to CS2 and CS3 to close the solenoid valves 52, 53, and to switch off the indicator lamp L of the push button PBL. The closed valve 52 will stop supply compressed air into the cylinders 32, whereas the closed valve 53 will close the pipe 442 ready for next pnuematic driving operation. The extinguished lamp L of PBL indicates that the bumper 1 has already been retracted. The air remained in the cylinders 32 will force back the bumper 1 at a stable retraction state.

When the selector switch SS is selected to the automatic operation AUT to light up the indicator lamp L1 and if upon a deep depression of the brake pedal 62 as shown in FIG. 3 to a lowest position C, the level 551 of sensor 55 is depressed to actuate the microswitch S1 to power the coils CS1, CS4 to open solenoid valve 51, 54 to direct compressed air into cylinders 31 as aforementioned so as to extend the bumper outwardly to stop until touching the switch S3. For retracting the extended bumper 1, the push button PBL is depressed to return the bumper 1 as above mentioned.

When it is intended to brake a running car normally, a brake pedal 62 may be trodden from position A to B to brake the car. So, in a normal braking operation, the sensor 55 of the present invention will not be actuated to extend the bumper 1 outwardly. Whenever encountering an emergency situation, a sudden treading of the pedal 62 may depress the pedal 62 deeply towards the position C, thereby depressing the lever 551 of sensor 55 to actuate the switch S1 for extending the bumper 1. The extended bumper 1 may prevent a direct seerious hit on a front car provided with the present invention, by a rear colliding car.

The bumper 1 may be mounted on the two guide rods 2 by universal joints 11 to counterbalance any twisting force caused by any unbalanced movement by the two sets of cylinders 31, 32 and two rods 2 to prevent deformation or bending accident of the bumper bar 1.

The extending speed for protruding the bumper 1 depends upon the pressure of the fluid (compressed air or boosted hydraulic oil) which pressure can be optionally adjusted according to practical requirement.

Figure 7:
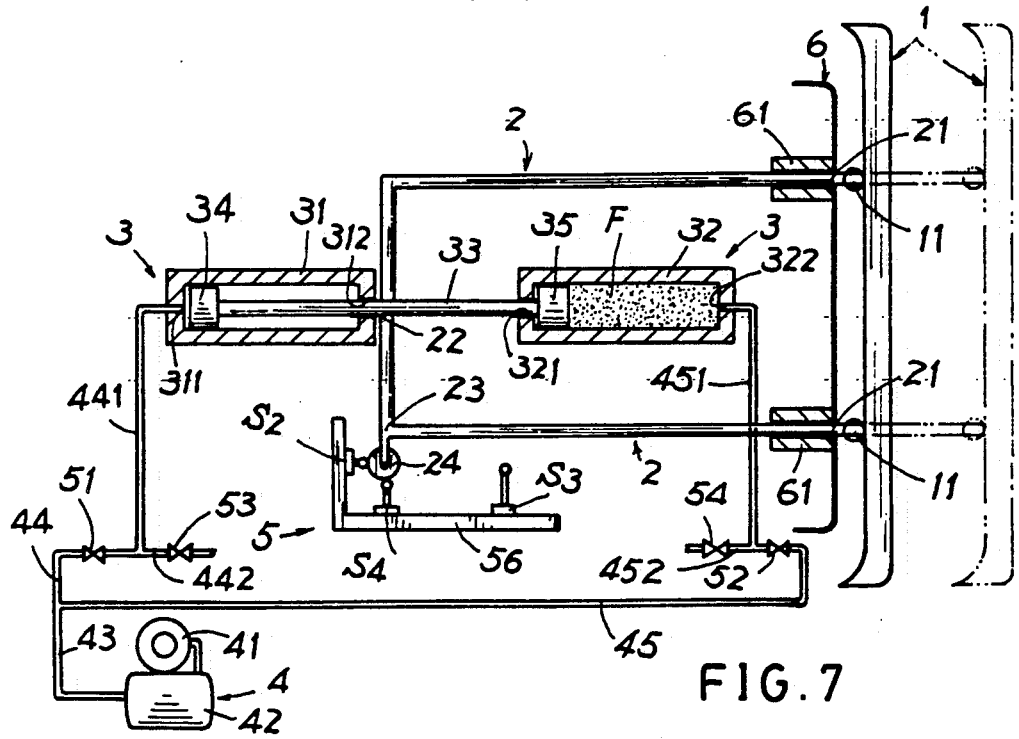
FIG. 7 shows another preferred embodiment of the present invention.

The number of sets of cylinders 31, 32 is not limited. As shown in FIG. 7, the aforementioned two sets of cylinders 31, 32 have been simplified to be a single set of cylinders 31, 32. The present invention can be suitably modified by those skill in the art without departing from the claiming scope of this application. The present invention may be mounted on either rear or front portion of a car.

The present invention is superior a conventional bumper with the following advantages:

1. The bumper 1 is normally retracted to be positioned approximate to a car body and may only be extended outwardly for dampening, cushioning or counterbalancing an external impact force hitting thereon, without influencing a streamline appearance of the car and without influencing a normal brake operation.

2. The extended bumper may serve as a sound cushioning as backed by an air pressure in the cylinders 31. Such an air cushioning may greatly dampen an external impact force acting on the bumper since the air is easily compressible than a spring.

Figure 2:
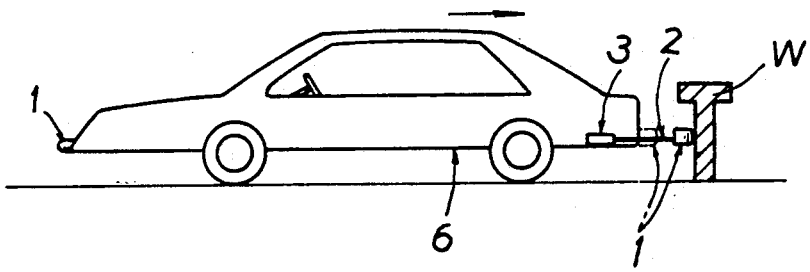
FIG. 2 shows another use of the present invention.

3. The extension of bumper can be operated either automatically or manually so that even a car backing for parking as shown in FIG. 2, the bumper may first be extended to "touch" the wall W to prevent any damage caused to the car body, for example, a rear light of the car.

I claim:

1. A telescopically-operated vehicle bumper comprising:
   a bumper secured on two guide rods reciprocatively held on a chassis of a car body;
   a driving means operatively extending said bumper outwardly for preventing a direct hit on the cat body by an external impact force acting on said bumper, and operatively retracted to be approximate to the car body;
   a driving fluid booster producing a high pressure fluid for driving said driving means for extending or retracting said bumper; and
   a control means having a sensor operatively trodden by a brake pedal for actuating an electrical control circuit for controlling the extending or the retraction of said bumper, the improvement which comprises:
   said driving means including at least one set of twin cylinders having a primary cylinder and a secondary cylinder respectively provided with two pistons in said twin cylinders secured on two opposite ends of a piston rod connected to one said guide rod, said primary cylinder having a left hole formed in a left end portion of the primary cylinders for directing driving fluid therethrough, said secondary cylinder having a right hole formed on a right end portion of the secondary cylinder for directing fluid therethrough opposite to the primary cylinder, said piston rod reciprocating through a right rod hole formed on a right end portion of the primary cylinder and through a left rod hole formed on a left end portion of the secondary cylinder, whereby when directing a driving fluid into said primary cylinder to push two said pistons and releasing the fluid in said secondary cylinder, said piston rod, said guide rod, said bumper can be extended outwardly, and upon a flowing of the driving fluid into the secondary cylinder and releasing of the fluid from the primary cylinder, the bumper can be retracted; and
   said control means including a first solenoid valve normally closed and provided in a first pipe operatively open for directing fluid into said primary cylinder, a second solenoid valve normally closed and provided in a seccond delivery pipe operatively opened for directing fluid into said secondary cylinder, a third solenoid valve normally closed and provided in a vent pipe branched from said first delivery pipe operatively opened for releasing fluid from said primary cylinder, and a fourth solenoid valve normally closed and provided in another vent pipe branched from the second delivery pipe operatively opened for releaasing fluid from said secondary cylinder, and a first microswitch provided in said sensor operatively depressed by a brake pedal for extending the bumper, a second microswitch provided at a left dead point of the pistons to be operatively actuated by an actuating roller secured on an inner end portion of the guide rod for switching off an extension indicator lamp when retracting the bumper, a third microswitch provided at a right dead point of the pistons to be operated by said actuating roller for closing said first and fourth solenoid valves for stopping the outward extending of the bumper, and a fourth microswitch provided at the left dead point of the pistons to be operatively depressed by said roller for closing said second and third solenoid valves for stopping the inward retraction of the bumper, said extension indicator lamp being lit when powered by the electrical control circuit through said second microswitch normally closed upon an extension of the bumper.

2. A vehicle bumper according to claim 1, wherein said first microswitch formed in said sensor is adjustable to be depressible by a brake pedal; and said second, third and fourth microswitches are adjustably secured on a positioning adjuster mounted on a chassis for adjusting the stroke of the reciprocative pistons and rods.

* * * * *